US00RE34840E

United States Patent [19]

Yamaguchi et al.

[11] E Patent Number: Re. 34,840

[45] Reissued Date of Patent: Jan. 31, 1995

[54] ELECTROPHOTOGRAPHIC APPARATUS WITH MANUAL AND PROGRAMMABLE BLADE CLEANER

[75] Inventors: Yasuyoshi Yamaguchi; Susumu Matsuda, both of Shizuoka, Japan

[73] Assignee: Tokyo Electric Co., Ltd., Tokyo, Japan

[21] Appl. No.: 981,260

[22] Filed: Nov. 25, 1992

Related U.S. Patent Documents

Reissue of:

[64] Patent No.: 5,073,800
Issued: Dec. 17, 1991
Appl. No.: 518,653
Filed: May 3, 1990

[30] Foreign Application Priority Data

May 11, 1989 [JP] Japan ..... 1-117843
May 11, 1989 [JP] Japan ..... 1-117845

[51] Int. Cl.[6] ..... G03G 21/00

[52] U.S. Cl. ..... 355/297; 15/256.51; 355/296; 355/299

[58] Field of Search ..... 15/256.51; 355/208, 355/296, 297, 299

[56] References Cited

U.S. PATENT DOCUMENTS 4,568,174 2/1986 Stange ..... 15/256.51 X
4,619,523 10/1986 Maeda et al. ..... 355/299
4,727,395 2/1988 Oda et al. ..... 346/160
4,969,015 11/1990 Sanpe ..... 355/297

FOREIGN PATENT DOCUMENTS 0037248 10/1981 European Pat. Off. .
0080868 11/1982 European Pat. Off. .
0092196 10/1983 European Pat. Off. .
0036153 9/1980 Japan .
0149084 9/1983 Japan .
0121370 7/1984 Japan .
0198482 11/1984 Japan ..... 355/297
0119589 6/1985 Japan .
0153074 8/1985 Japan ..... 355/297
0024717 6/1986 Japan .
0092984 4/1987 Japan .
0163081 7/1987 Japan .
0250676 10/1988 Japan ..... 355/297

*Primary Examiner*—Leo P. Picard
*Assistant Examiner*—Christopher Horgan
*Attorney, Agent, or Firm*—Frishauf, Holtz, Goodman & Woodward

[57] ABSTRACT

An electrophotographic apparatus includes an image forming mechanism for forming an image on a paper sheet, and a magnetic cleaning system for magnetically cleaning cleaning a surface of an image carrier of the mechanism for each cycle of image formation. A mechanical cleaning system is provided for mechanically cleaning the image carrier. The mechanical cleaning system includes a blade movable between a contact position where it contacts with the surface of the carrier and an off position where it is kept apart from the surface. The blade is intermittently moved to the contact position, by a drive mechanism and a control unit, for predetermined operating times at predetermined time intervals. The blade is arranged to be manually operable through a lever attached to the blade.

10 Claims, 9 Drawing Sheets

ELECTROPHOTOGRAPHIC APPARATUS WITH MANUAL AND PROGRAMMABLE BLADE CLEANER

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an electrophotographic apparatus.

2. Description of the Related Art

In general, an electrophotographic apparatus comprises a drum-shaped image carrier disposed in an apparatus casing for rotation and an image forming mechanism arranged around the image carrier. The image forming mechanism includes a charger for uniformly charging the surface of the image carrier and an exposure unit for applying a laser beam to the charged image carrier surface in accordance with print data or the like, thereby forming an electrostatic latent image on the surface. The mechanism further includes a developing device for applying a toner to the image carrier surface with the electrostatic latent image thereon, thereby developing the latent image, a transfer device for transferring the resulting toner image to a paper sheet, and a de-electrifier for de-electrifying the image carrier after transfer. These elements are arranged successively around the image carrier.

If the toner or paper dust adheres to or remains on the surface of the image carrier after the transfer of the toner image, part of the printable surface of the paper sheet to be printed next may often blacken, thus entailing defective printing. Accordingly, the electrophotographic apparatus is provided with a cleaning system for cleaning the surface of the image carrier after the transfer.

Conventional cleaning systems include mechanical and magnetic cleaning systems.

In the mechanical cleaning system, a blade is brought into contact with the surface of the image carrier so that the residual toner is scraped from the image carrier surface by the blade, and the scraped toner is collected into a waste toner receiving portion. Since this system is designed so that the residual toner is scraped off directly by means of the blade, the image carrier can be satisfactorily cleaned for a long period of time. If the blade vibrates or if the pressure of contact between the blade and the image carrier becomes too high during the cleaning operation, however, the surface of the image carrier can be easily damaged. Thus, satisfactory print quality cannot be maintained.

The magnetic cleaning system, which is formed integrally with the developing device, cooperates therewith to effect development and remove the toner remaining on the surface of the image carrier by magnetic force so that the removed toner is recovered in the developing device. Although the control of the magnetic cleaning system is more complicated than that of the mechanical cleaning system, the magnetic system can recover the residual toner for reuse without touching the image carrier. Accordingly, many of modern electrophotographic apparatuses use the magnetic cleaning system.

When the residual toner adheres firmly to the surface of the image carrier, however, it cannot be securely removed if the image carrier surface is cleaned by means of the magnetic cleaning system whose cleaning capacity is lower than that of the mechanical cleaning system. In such a case, the residual toner causes defective printing, such as partial blackening of the printable surface of the paper sheet. If the cleaning capacity of the cleaning system is lowered during use, in particular, defective printing is liable to be caused.

The cleaning capacity of the magnetic cleaning system cannot be adjusted during the operation of the electrophotographic apparatus. In order to eliminate defective printing caused during the operation of the apparatus, therefore, the operation of the apparatus must be interrupted to adjust the cleaning system, thereby increasing its cleaning capacity. Accordingly, the printing efficiency is lowered. This problem may possibly be solved by previously adjusting the cleaning system to the maximum cleaning capacity before the start of the operation of the apparatus. If this is done, however, lowering of the capacity of the cleaning system will be accelerated, so that the lifetime of the system will be shortened.

SUMMARY OF THE INVENTION

The present invention has been contrived in consideration of these circumstances, and its object is to provide an electrophotographic apparatus capable of stably cleaning an image carrier for a long period of time and preventing the print quality and printing efficiency from lowering.

In order to achieve the above object, an electrophotographic apparatus according to the present invention comprises magnetic cleaning means for magnetically cleaning an image carrier and mechanical cleaning means for mechanically cleaning the image carrier. Usually, the image carrier is cleaned by means of the magnetic cleaning means, and the mechanical cleaning means is optionally actuated to supplement the cleaning capacity of the magnetic one. Thus, a stable cleaning effect can be ensured for a long period of time. If defective printing is caused by unsatisfactory cleaning, moreover, the mechanical cleaning mean is immediately actuated to compensate the deficiency in the cleaning effect.

More specifically, the electrophotographic apparatus according to the invention comprises image forming means including an image carrier, for forming an image on a recording medium; magnetic cleaning means for magnetically cleaning the surface of the image carrier; mechanical cleaning means for mechanically cleaning the surface of the image carrier, the mechanical cleaning means including a contact member capable of touching and leaving the surface of the image carrier; and actuating means for optionally bringing the contact member into contact with the surface of the image carrier.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1 to 15 show an electrophotographic apparatus according to an embodiment of the present invention, in which FIG. 1 is a sectional view schematically showing the apparatus;

FIG. 2 is a timing chart for illustrating the operation of a magnetic cleaning system;

FIG. 3A is a timing chart for illustrating a firstmode operation of the mechanical cleaning system;

FIG. 3B is a timing chart for illustrating a secondmode operation of the mechanical cleaning system;

FIG. 3C is a timing chart for illustrating a thirdmode operation of the mechanical cleaning system;

FIG. 4 is a flow chart showing the first mode;

FIGS. 5 to 9 are flow charts showing the second mode;

FIGS. 10 to 14 are flow charts showing the third mode;

FIG. 15 is a flow chart showing optional processing; and

DETAILED DESCRIPTION OF THE PREFERRED EMBODIMENTS

Preferred embodiments of the present invention will now be described in detail with reference to the accompanying drawings.

Figure 1:
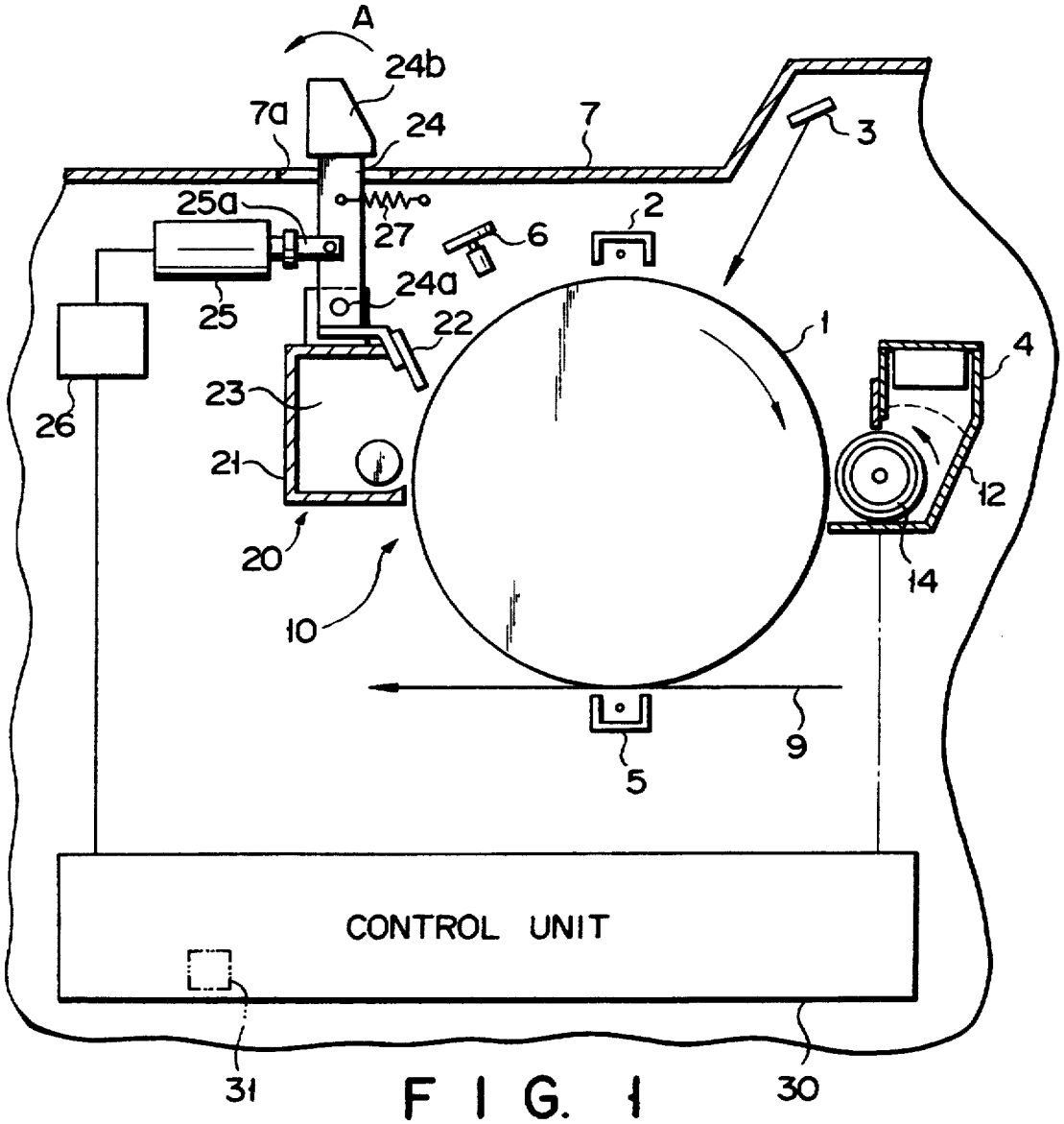

As shown in FIG. 1, an electrophotographic apparatus according to an embodiment of the present invention comprises a casing 7 and an image forming mechanism 10 disposed therein. The mechanism 10 includes a rotatable photoconductive drum 1 as an image carrier, a charger 2 for uniformly charging the surface of the drum, and an exposure unit 3 for applying a laser beam to the charged drum surface in accordance with print data or the like, thereby forming an electrostatic latent image on the drum surface. The mechanism 10 further includes a developing device 4 for applying a toner to the drum surface with the electrostatic latent image thereon, thereby developing the latent image, a transfer device 5 for transferring the resulting toner image to a paper sheet 9, and an eraser 6 for de-electrifying the drum after transfer. These elements are arranged successively around the drum.

The electrophotographic apparatus further comprises a magnetic cleaning system 14 for cleaning the surface of the drum 1. The system 14, which is formed integrally with the developing device 4, cooperates therewith to remove the toner remaining on the surface of the drum 1 by means of magnetic action. The removed toner is recovered in a housing 12 of the developing device 4. The developing device 4, which is connected electrically to a control unit 30 mentioned later, alternately performs developing and cleaning operations at intervals of predetermined time t under the control of the control unit. The time t is adjusted to the period of time required for one revolution of the drum 1.

Furthermore, the electrophotographic apparatus comprises a mechanical cleaning system 20 which is used to supplement the cleaning capacity of the magnetic cleaning system 14. The system 20 includes a blade 22, which can touch and leave the surface of the drum 1.

More specifically, the cleaning system 20 includes a lever 24 which is rotatable around a pivot 24a in the casing 7, and the blade 22 is fixed to the lower end portion of the lever. As the lever 24 rotates, the blade 22 can move between a contact position where it is in contact with the surface of the drum 1 and an off position where it is kept apart from the drum surface. In the contact position, the blade 22 serves to scrape off the residual toner from the drum surface, and the scraped toner is recovered in a receiving portion 23 defined by a housing 21. A tension spring 27 is stretched between the lever 24 and the casing 7, and the lever 24 and the blade 22 are normally kept in the off position shown in FIG. 1.

The upper end portion of the lever 24 projects to the outside of the casing 7 through an opening 7a in the casing. An operating knob 24b is attached to the projecting end of the lever 24. In this arrangement, the blade 22 can be moved to the contact position by manually rotating the lever 24 in the direction of arrow A, against the urging force of the spring 27, from outside the casing 7. Thus, by manually operating the lever 24 to cause the blade 22 to touch and leave the surface of the drum 1 with desired timing, the cleaning capacity of the whole electrophotographic apparatus can be improved in accordance with printing results, without interrupting the operation of the apparatus.

Figure 1A:
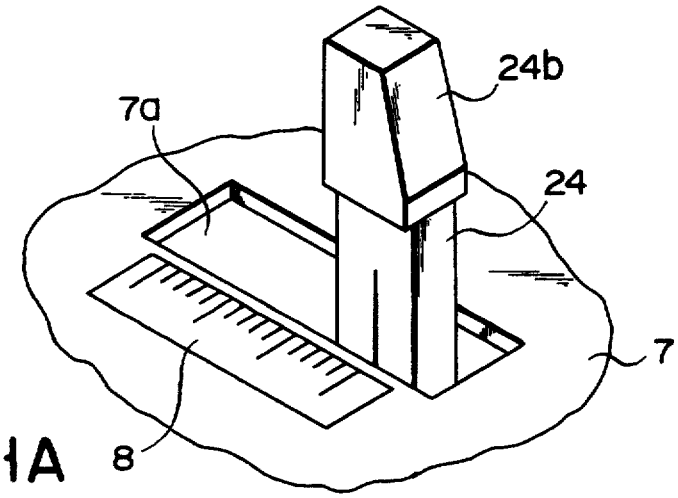
FIG. 1A is a perspective view showing an operating knob of a mechanical cleaning system and its surroundings.

As shown in FIG. 1A, a scale 8 for indicating the shift of the lever 24 is disposed on the outer surface of the casing 7 in the vicinity of the opening 7a. The pressure of contact between the blade 22 and the surface of the drum 1 can be easily adjusted by regulating the shift of the lever 24 according to the scale 8.

Further, the cleaning system 20 includes a solenoid 25 as a drive source for automatically rotating the lever 24. The solenoid 25, which has a plunger 25a connected to the lever 24, is connected to the control unit 30 through an interface 26. When the solenoid 25 is excited in response to a signal from the unit 30, the plunger 25a is drawn into the solenoid, so that the lever 24 is rotated in the direction of arrow A against the urging force of the spring 27. As a result, the blade 22 is brought into contact with the surface of the drum 1, thereby cleaning the drum surface.

Figures 2, 3A, 3B, 3C:
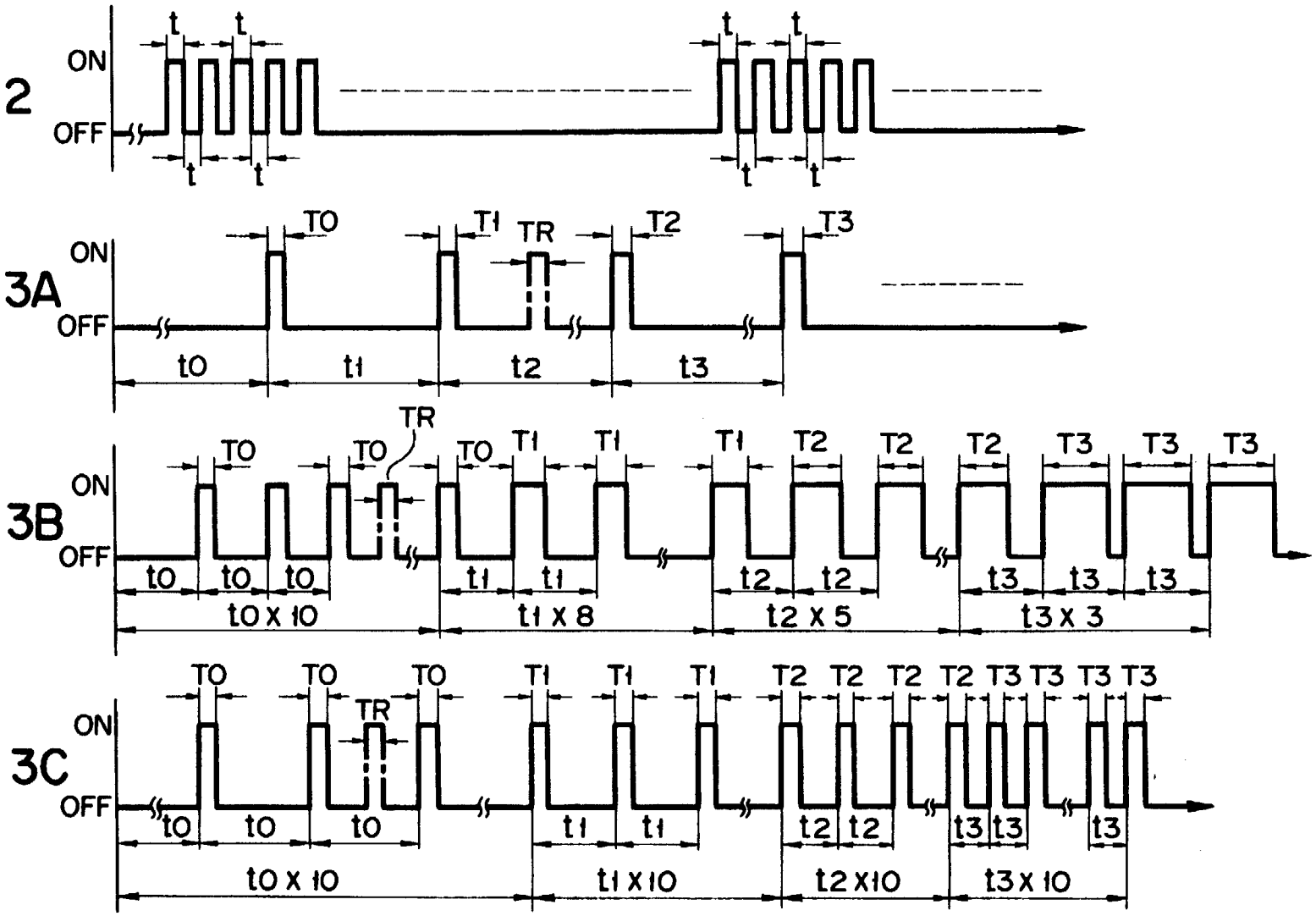

The control unit 30 is constructed by using a CPU, ROM, RAM, control panel, timer, etc., which constitutes a computer circuit in an automatic control device for controlling the operation of the image forming mechanism 10. If a key 31 on the control panel is depressed, the unit 30 excites the solenoid 25, thereby moving the blade 22. Programmed in the ROM are various operating modes for automatically intermittently operating the cleaning system 20 at suitable time intervals, e.g., first to third operating modes. If the first mode is established, the control unit 30 drives the mechanical cleaning system 20 for predetermined operating times T0, T1, T2, T3, . . . at intervals of predetermined times (rest-times) t0, t1, t2, t3, . . . , as shown in FIG. 3A. The rest-times and operating times are adjusted to periods of time which allow the residual toner, having failed to be removed by means of the magnetic cleaning system 14, to be scraped off by means of the blade 22 without damaging the surface of the drum 1. For example, the rest-times t0, t1, t2, t3, . . . are regular, and each rest-time is adjusted to the operation time of the apparatus required for 600 prints. The operating times T0, T1, T2, T3, . . . are regular, and each operating time is adjusted to the operation time required for two prints.

In general, the longer the operation time of the apparatus, the more the residual toner adhering to the surface of the drum 1 is. Thereupon, according to the second operating mode, the control unit 30 drives the mechanical cleaning system 20 for gradually increasing predetermined operating times T0, T1, T2, T3, . . . at the regular intervals of the rest-times t0, t1, t2, t3, . . . , as shown in FIG. 3B. For example, each rest-time is equivalent to the period of time required for 600 prints and the operating times T0, T1, T2 and T3 are equivalent to the periods of time required 2, 3, 4 and 5 prints, respectively. In this embodiment, the cleaning system 20 is driven for the operating time T0 before the passage of the rest-time t0×10 after the start of use of the drum 1; T1 before the passage of the rest-time t1×8 thereafter, T2 before the passage of the rest-time t2×5 thereafter, and T3 before the passage of the rest-time t3×3 thereafter.

If the third mode is established, the control unit 30 drives the mechanical cleaning system 20 for the regular operating times T0, T1, T2, T3, . . . , equivalent to the period of time required for, e.g., two prints, at gradually reducing rest-times t0, t1, t2, t3, . . . , as shown in FIG. 3C. If the lifetime of the drum 1 is equivalent to the period of time required for 15,000 prints, the first ten rest-times after the start of use of the drum 1 are t0 (equivalent to the period of 600 prints), second ten rest-times are t1 (equivalent to the period for 400 prints), third ten rest-times are t2 (equivalent to the period for 300 prints), and the last ten rest-times are t3 (equivalent to the period for 200 prints).

These values selected for the rest-times and he operating times are entered in the ROM of the control unit 30 through the control panel, so that they can be changed through the panel.

The ROM is programmed to the effect that the cleaning system 20 be driven by the control unit 30 to bring the blade 22 into contact with the surface of the drum 1 for a predetermined time Tr even during a rest-time when the blade 22 is kept off the drum surface, if the key 31 on the control panel is depressed to input an optional command signal. In other words, if the optional command signal is entered by means of the key 31, the CPU of the control unit 30 excites the solenoid 25 to bring the blade 22 into contact with the drum surface for the predetermined time Tr, as shown in FIGS. 3A to 3C, prior to the execution of a supplementary cleaning program based on the operating mode.

The following is a description of the operation of the electrophotographic apparatus constructed in this manner.

If a start command is inputted through the control panel of the apparatus, the automatic control device causes the drum 1 to rotate, and drives the charger 2, exposure unit 3, developing device 4, etc. in predetermined steps of procedure, thereby forming a toner image on the surface of the drum 1. The toner image is transferred to the fed paper sheet 9 in the transfer device 5, and thereafter, the eraser 6 is driven to deelectrify the residual charge on the drum surface.

When the image forming cycle is finished in this manner, the automatic control device stops driving the charger 2, exposure unit 3, developing device 4, transfer device 5, etc., and causes the control unit 30 to actuate the magnetic cleaning system 14 while rotating the drum 1. Thereupon, the drum 1 is cleaned for the predetermined time t, as shown in FIG. 2, and the magnetic toner remaining on the drum surface is recovered in the housing 12 of the developing device 4. Thereafter, printing operation is continuously performed while alternately repeating the image forming cycle and the cleaning cycle.

During the printing operation, the control unit 30 actuates the mechanical cleaning system 20 in accordance with the selected operating mode, thereby supplementing the cleaning capacity of the magnetic cleaning system 14.

Figure 4:
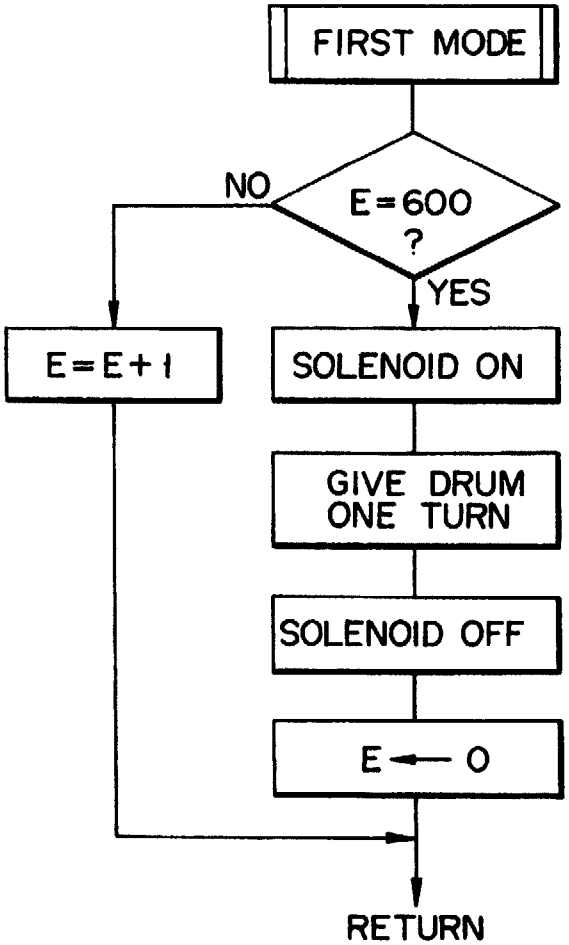

When the operation time of the apparatus comes to the rest-time t0 (equivalent to the period for 600 prints) in the case where the first operating mode is selected, the control unit 30 drives the solenoid 25 through the interface 26, thereby bringing the blade 22 into contact with the surface of the drum 1 for the operating time T0 (equivalent to the period for two prints), as shown in FIG. 3A. More specifically, when the operation of the apparatus is started, as shown in FIG. 4, the unit 30 reads print counter data E from a memory, and determines whether the value of the data E is "600 ." If the value is less than "600 ," the data E is counted up by "+1," whereupon the program returns to the main routine. If value of the data E is "600 ," the unit 30 turns on the solenoid 25 to bring the blade 22 into contact with the surface of the drum 1. In this state, the drum 1 is caused to make one revolution, so that the residual toner on the drum surface is mechanically removed. Then, the unit 30 turns off the solenoid 25 to disengage the blade 22 from the drum surface, and clears the counter data E. The RAM stored with the counter data E is backed up by a battery so that the data can be maintained even if the electrophotographic apparatus is disconnected from the power supply.

Thus, the surface of the drum 1 is supplementally cleaned by means of the blade 22, so that the residual toner, having failed to be removed by means of the magnetic cleaning system 14, can be scraped off.

Thereafter, the control unit 30 drives the solenoid 25 with the passage of each of the regular rest-times t0, t1, t2, t3, . . . , so that the blade 22 is brought into contact with the surface of the drum 1 for the regular operating times T0, T1, T2, T3, . . . , thereby scraping off the unrecovered residual toner.

When the second operating mode is established, the control unit 30 drives the mechanical cleaning system 20 for the gradually increasing predetermined operating times T0, T1, T2, T3, . . . at the regular intervals of the rest-times t0, t1, t2, t3, . . . , equivalent to the period of time required for, e.g., 600 prints, as shown in FIG. 3B.

Figure 5:
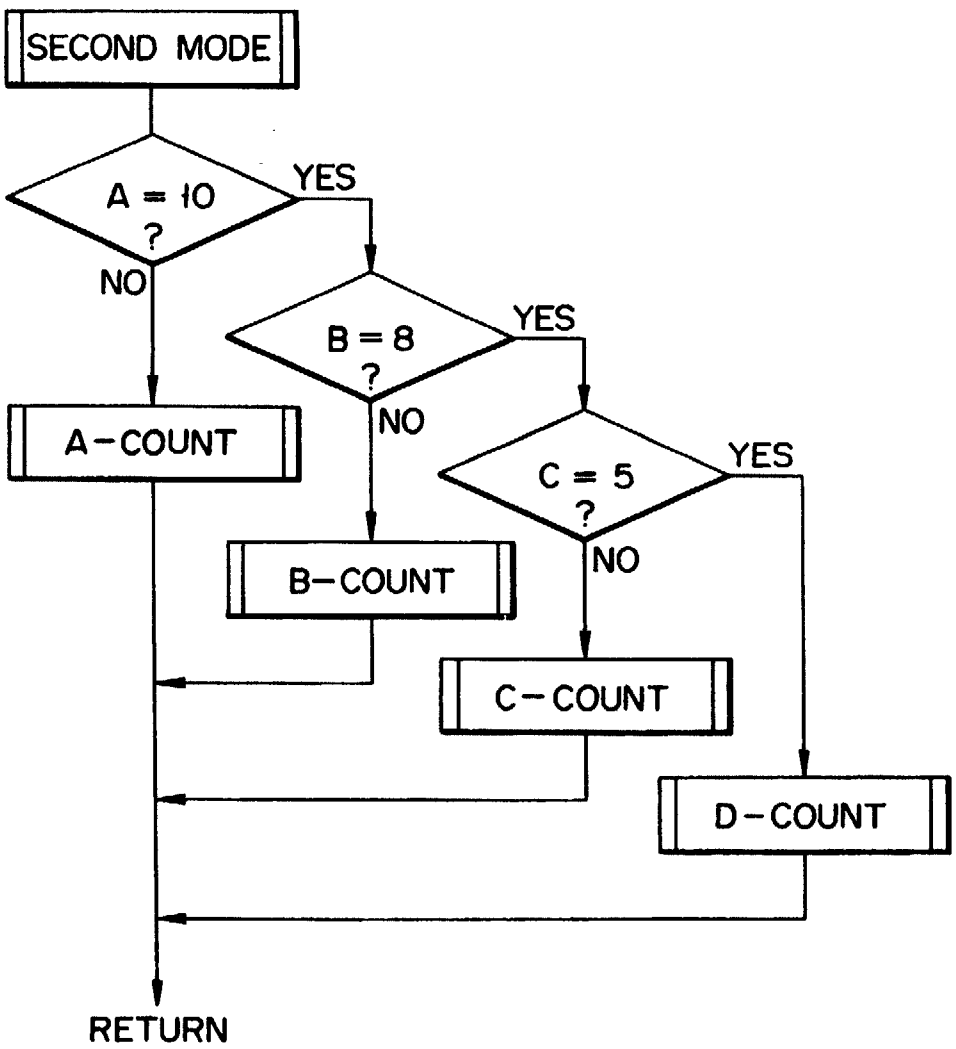
Figure 6:
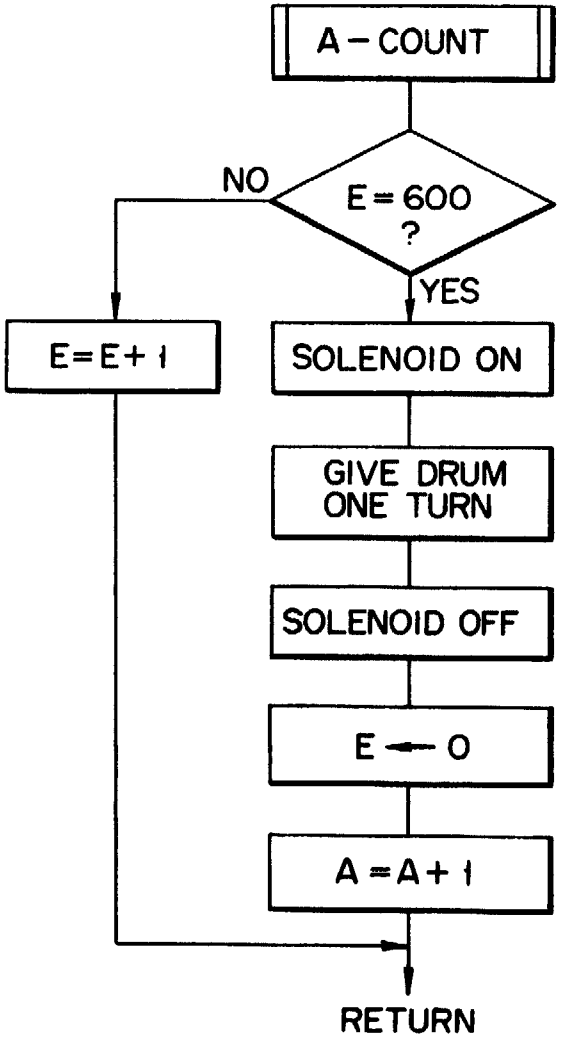

More specifically, the unit 30 reads blade counter data A, indicative of the frequency of operation of the blade 22, from the memory of the control device. If the data A is "10," as shown in FIG. 5, the unit 30 reads the next blade counter data B. If the data A is not "10," the unit 30 executes a subroutine "A-COUNT." After the execution, the program returns to the main routine. If the counter data B is "8," the unit 30 reads the next blade counter data C. If the data B is not "8," the unit 30 executes a subroutine "B-COUNT." After the execution, the program returns to the main routine. If the counter data C is "5," the unit 30 executes a subroutine "D-COUNT," whereupon the program returns to the main routine. If the counter data C is not "5," a subroutine "C-COUNT" is executed, whereupon the program returns to the main routine. In the subroutine "A-COUNT," as shown in FIG. 6, the control unit 30 first reads the counter data E, indicative of the number of prints, from the memory. If the data E is less than "600 ," it is counted up by "+1," whereupon the program returns to the main routine. If the data E is "600 ," the unit 30 turns on the solenoid 25 to bring the blade 22 into contact with the surface of the drum 1. Thus, the drum is cleaned while it makes one revolution. Then, the unit 30 turns off the solenoid 25 to disengage the blade 22 from the drum 1. Thereafter, the unit 30 clears the counter data E, and counts up the counter data A by "+1," whereupon the program returns to the main routine.

Figure 7:
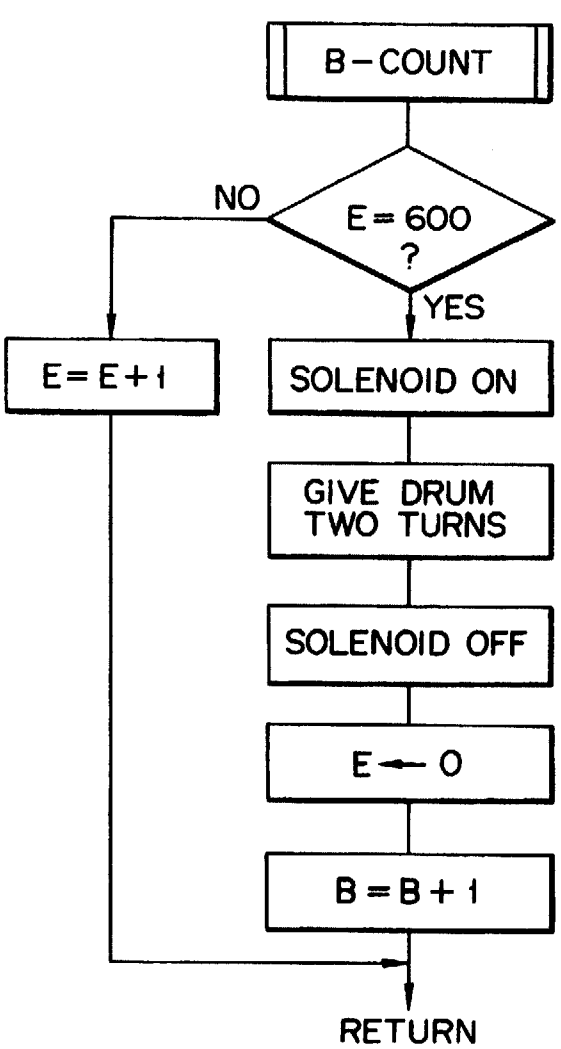

In the subroutine "B-COUNT," as shown in FIG. 7, the control unit 30 first reads the counter data E from the memory. If the data E is less than "600 ," it is counted up by "+1," whereupon the program returns to the main routine. If the data E is "600 ," the unit 30 turns on the solenoid 25 to bring the blade 22 into contact with the surface of the drum 1. Thus, the drum is cleaned while it makes two revolutions. Then the unit 30 turns off the solenoid 25 to disengage the blade 22 from the drum 1. Thereafter, the unit 30 clears the counter data E, and counts up the counter data B by "+1," whereupon the program returns to the main routine.

Figure 8:
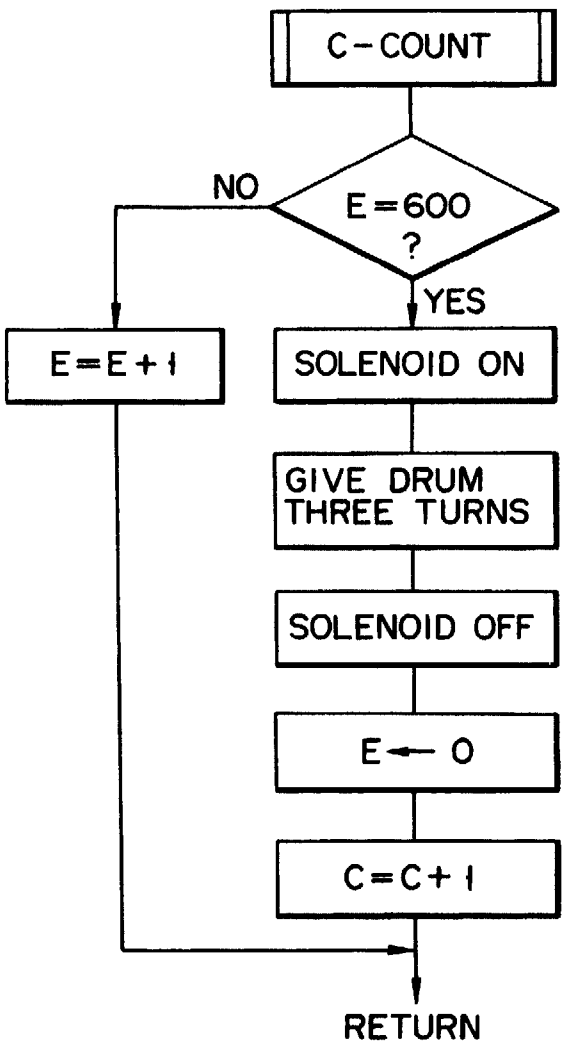

In the subroutine "C-COUNT," as shown in FIG. 8, the control unit 30 first reads the counter data E from the memory. If the data E is less than "600 ," it is counted up by "+1," whereupon the program returns to the main routine. If the data E is "600 ," the unit 30 turns on the solenoid 25 to bring the blade 22 into contact with the surface of the drum 1. Thus, the drum is cleaned while it makes three revolutions. Then, the unit 30 turns off the solenoid 25 to disengage the blade 22 from the drum 1. Thereafter, the unit 30 clears the counter data E, and counts up the counter data C by "+1," whereupon the program returns to the main routine.

Figure 9:
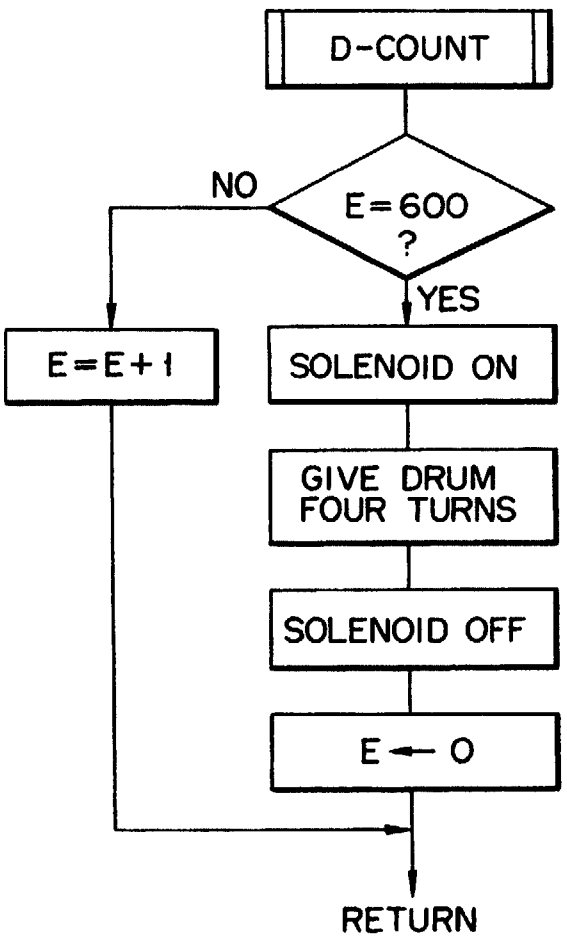

In the subroutine "D-COUNT," as shown in FIG. 9, the control unit 30 first reads the counter data E from the memory. If the data E is less than "600 ," it is counted up by "+1," whereupon the program returns to the main routine. If the data E is "600 ," the unit 30 turns on the solenoid 25 to bring the blade 22 into contact with the surface of the drum 1. This, the drum is cleaned while it makes four revolutions. Then, the unit 30 turns off the solenoid 25 to disengage the blade 22 from the drum 1, and clears the counter data E, whereupon the program returns to the main routine.

Thus, according to the second operating mode, the unit 30 causes the drum 1 to make one revolution while bringing the blade 22 into contact with the surface of the drum, thereby cleaning the drum, for each 600 prints before 6,000 (=600×10) prints are made after the start of printing. Before 4,800 (=600×8) prints are made thereafter, the unit 30 causes the drum 1 to make two revolutions while bringing the blade 22 into contact with the drum surface, thereby cleaning the drum, for each 600 prints. Before 3,000 (=600×5) prints are made thereafter, the unit 30 causes the drum 1 to make three revolutions while bringing the blade 22 into contact with the drum surface, thereby cleaning the drum, for each 600 prints. Thereafter, the unit 30 causes the drum 1 to make four revolutions while bringing the blade 22 into contact with the drum surface, thereby cleaning the drum, for each 600 prints.

Thus, by extending the operating time of the blade 22 in proportion to the increase of the working time of the electrophotographic apparatus, the residual toner adhering to the surface of the drum 1 can be securely removed.

If the third mode is established, the control unit 30 drives the mechanical cleaning system 20 for the regular operating times T0, T1, T2, T3, . . . , equivalent to the period of time required for, e.g., one print, at gradually reducing rest-time t0, t1, t2, t3, . . . , as shown in FIG. 3C.

Figure 10:
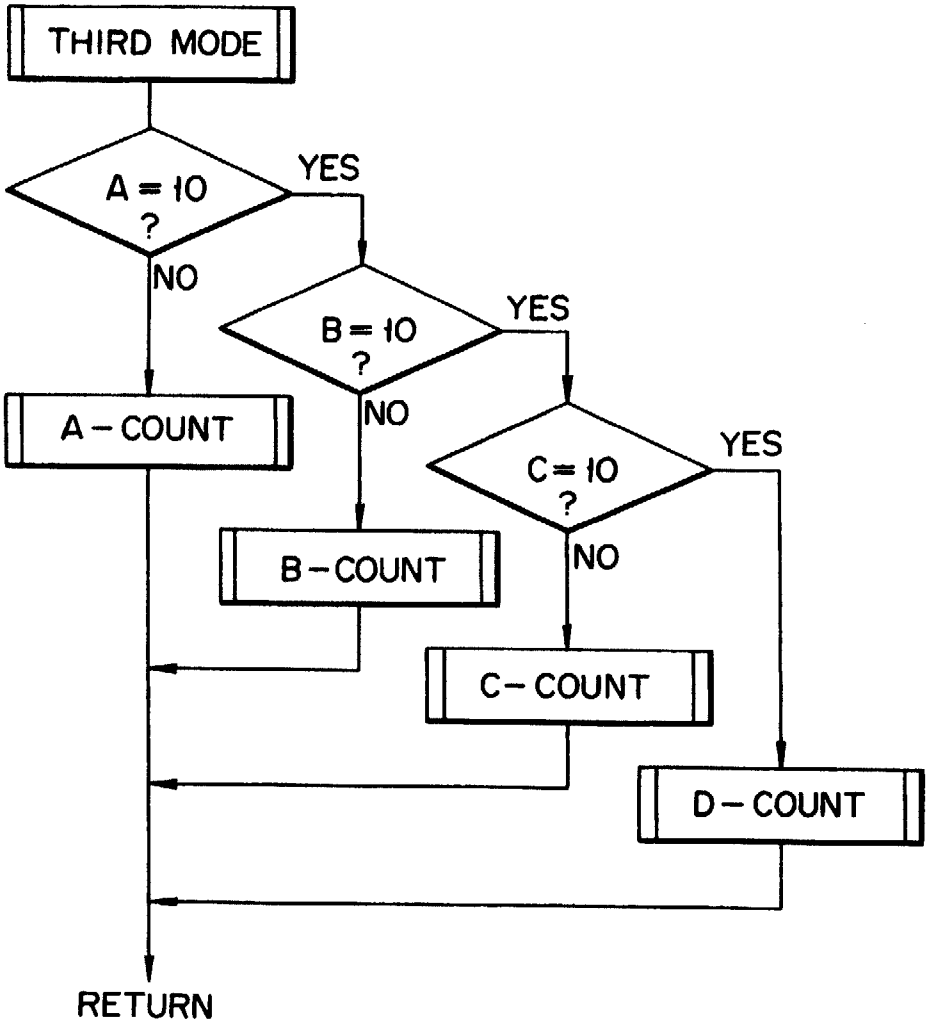

More specifically, the unit 30 reads the blade counter data A, indicative of the frequency of operation of the blade 22, from the memory of the control device. If the data A is "10," as shown in FIG. 10, the unit 30 reads the next blade counter data B. If the data A is not "10," the unit 30 executes the subroutine "A-COUNT." After the execution, the program returns to the main routine. If the counter data B is "10," the unit 30 reads the next blade counter data C. If the data B is not "10," the unit 30 executes the subroutine "B-COUNT." After the execution, the program returns to the main routine. If the counter data C is "10," the unit 30 executes the subroutine "D-COUNT," whereupon the program returns to the main routine. If the counter data C is not "10," the subroutine "C-COUNT" is executed, whereupon the program returns to the main routine.

Figure 11:
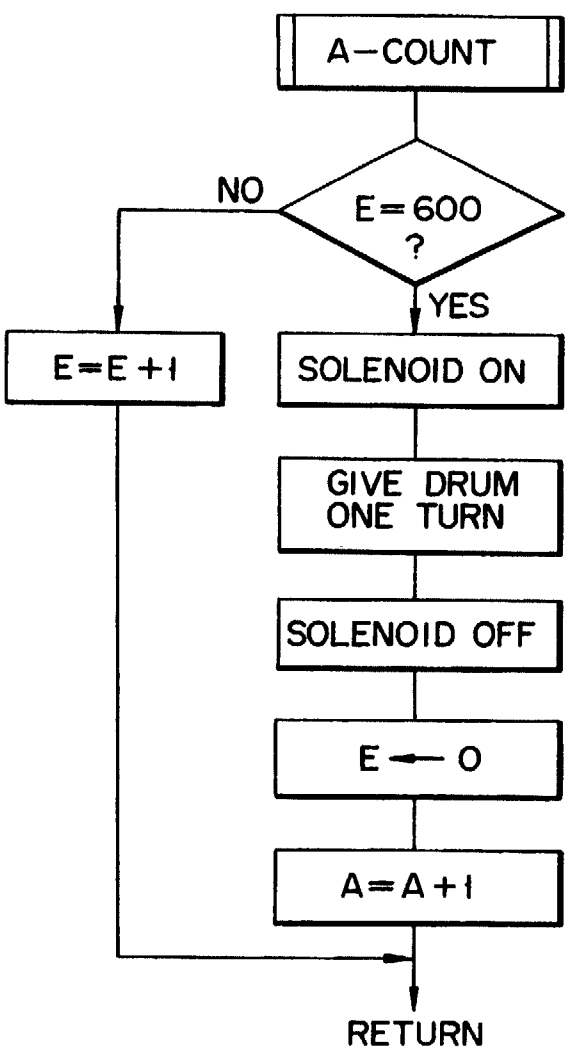

In the subroutine "A-COUNT," as shown in FIG. 11, the control unit 30 first reads the counter data E, indicative of the number of prints, from the memory. If the data E is less than "600 ," it is counted up by "+1," whereupon the program returns to the main routine. If the data E is "600 ," the unit 30 turns on the solenoid 25 to bring the blade 22 into contact with the surface of the drum 1. Thus, the drum is cleaned while it makes one revolution. Then, the unit 30 turns off the solenoid 25 to disengage the blade 22 from the drum 1. Thereafter, the unit 30 clears the counter data E, and counts up the counter data A by "+1," whereupon the program returns to the main routine.

Figure 12:
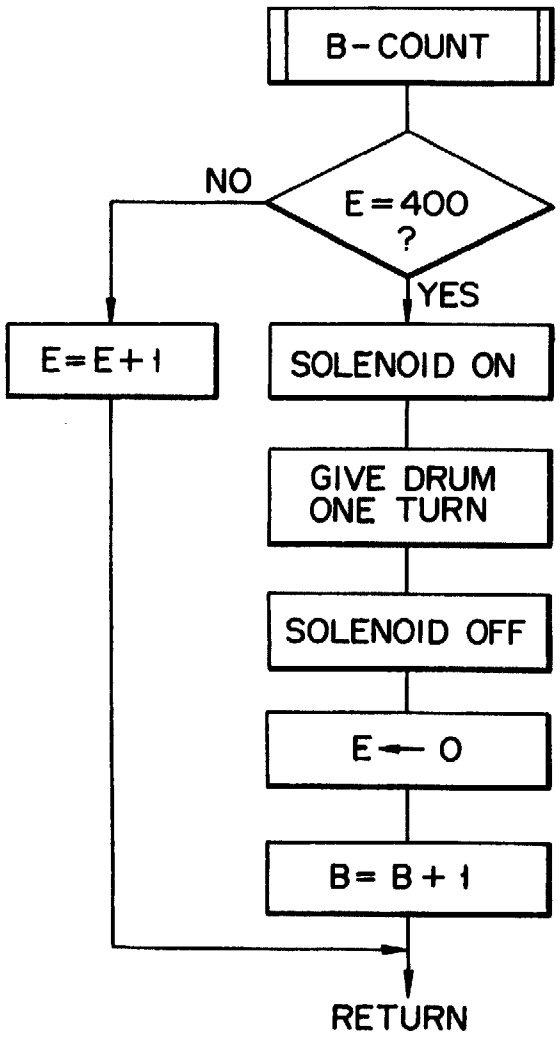

In the subroutine "B-COUNT," as shown in FIG. 12, the control unit 30 first reads the counter data E from the memory. If the data E is less than "400," it is counted up by "+1," whereupon the program returns to the main routine. If the data E is "400," the unit 30 turns on the solenoid 25 to bring the blade 22 into contact with the surface of the drum 1. Thus, the drum is cleaned while it makes one revolution. Then, the unit 30 turns off the solenoid 25 to disengage the blade 22 from the drum 1. Thereafter, the unit 30 clears the counter data E, and counts up the counter data B by "+1," whereupon the program returns to the main routine.

Figure 13:
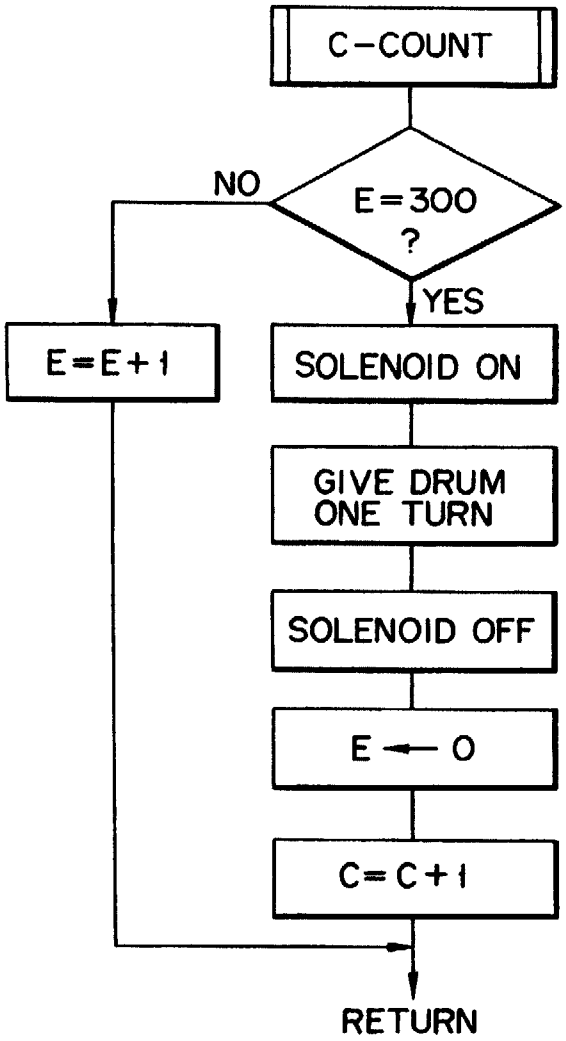

In the subroutine "C-COUNT," as shown in FIG. 13, the control unit 30 first reads the counter data E from the memory. If the data E is less than "300," it is counted up by "+1," whereupon the program returns to the main routine. If the data E is "300," the unit 30 turns on the solenoid 25 to bring the blade 22 into contact with the surface of the drum 1. Thus, the drum is cleaned while it makes one revolution. Then, the unit 30 turns off the solenoid 25 to disengage the blade 22 from the drum 1. Thereafter, the unit 30 clears the counter data E, and counts up the counter data C by "+1," whereupon the program returns to the main routine.

Figure 14:
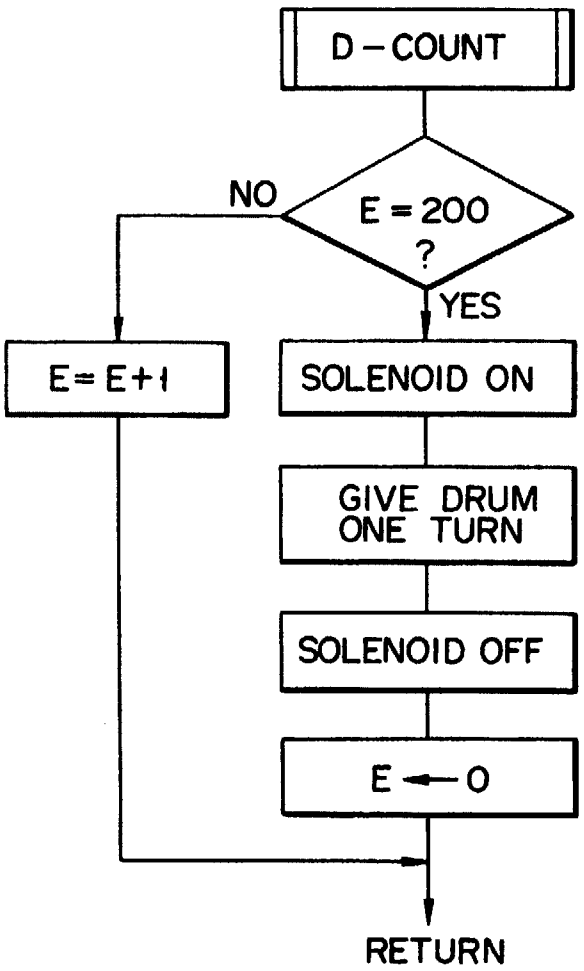

In the subroutine "D-COUNT," as shown in FIG. 14, the control unit 30 first reads the counter data E from the memory. If the data E is less than "200," it is counted up by "+1," whereupon the program returns to the main routine. If the data E is "200," the unit 30 turns on the solenoid 25 to bring the blade 22 into contact with the surface of the drum 1. Thus, the drum is cleaned while it makes one revolution. Then, the unit 30 turns off the solenoid 25 to disengage the blade 22 from the drum 1, and clears the counter data E, whereupon the program returns to the main routine.

Thus, according to the third operating mode, the unit 30 causes the drum 1 to make one revolution while bringing the blade 22 into contact with the surface of the drum thereby cleaning the drum, for each 600 prints before 6,000 (=600×10) prints are made after the start of printing. Before 4,000 (=400×10) prints are made thereafter, the unit 30 causes the drum 1 to make one revolution while bringing the blade 22 into contact with the drum surface, thereby cleaning the drum, for each 400 prints. Before 3,000 (=300×10) prints are made thereafter, the unit 30 causes the drum 1 to make one revolution while bringing the blade 22 into contact with the drum surface, thereby cleaning the drum, for each 300 prints. Thereafter, the unit 30 causes the drum 1 to make one revolution while bringing the blade 22 into contact with the drum surface, thereby cleaning the drum, for each 200 prints.

Thus, by shortening the rest-time of the blade 22 in proportion to the increase of the working time of the electrophotographic apparatus, the residual toner adhering to the surface of the drum 1 can be securely removed.

In each of the first to third modes, the result of printing may sometimes indicate unsatisfactory cleaning. In such a case, a lot of defective prints will inevitably be produced until the control unit 30 causes, in each operating mode, the blade 22 to perform supplementary cleaning.

Figure 15:
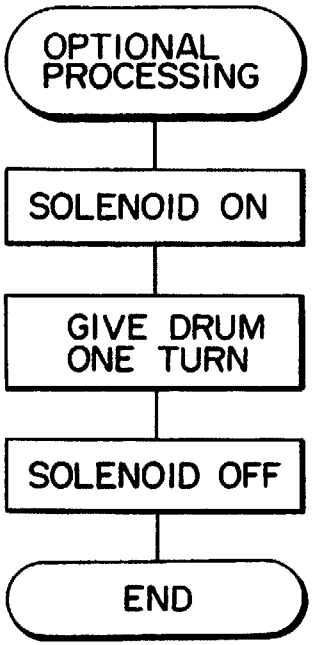

In case of defective printing, such as blackening of the printable surface, therefore, an operator depresses the key 31 on the control panel of the automatic control device. Thereupon, an optional command signal is entered in the control unit 30, so that the unit 30 turns on the solenoid 25 to bring the blade 22 into contact with the drum surface, thereby effecting the supplementary cleaning, for the predetermined time Tr (equivalent to the period for one revolution of the drum), as shown in FIG. 15, even during a rest-time of the mechanical cleaning system 20.

In case of defective printing, moreover, the operator can directly manually operate the blade 22 for the supplementary cleaning. More specifically, the operator can perform the supplementary cleaning by rotating the lever 24 in the direction of arrow A of FIG. 1 by means of the knob 24b, thereby bringing the blade 22 into contact with the surface of the drum 1.

Thus, by entering the command signal in the control unit 30 through the key 31, or by manual operation, the cleaning capacity can be quickly increased as required to eliminate defective printing, without interrupting the opera&ion of the apparatus.

According to the electrophotographic apparatus constructed in this manner, the magnetic cleaning system 14 integral with the developing device 4 is combined with the mechanical cleaning system 20 including the blade 22, and the control unit 30 is used to cause the blade 22 of the system 20 to touch and leave the surface of the photoreceptor drum 1. In this arrangement, the drum 1, which is normally cleaned by means of the magnetic cleaning system 14, can enjoy automatic intermittent supplemental cleaning by means of the mechanical cleaning system 20, which supplements the cleaning capacity of the system 14. Thus, stable cleaning can be ensured for a long period of time, and the print quality and printing efficiency can be prevented from lowering.

The control unit 30 is designed so as to cause the blade 22 to repeat contact with and disengagement from the drum 1 at the predetermined time intervals. Accordingly, the blade 22 can be brought into contact with the drum 1 for supplementary cleaning at suitable time intervals. Thus, the cleaning capacity can be supplemented without damaging the surface of the drum 1.

Further, the control unit 30 is designed so as to bring the blade 22 into contact with the drum 1 in response to an optional command signal even during a rest-time of the mechanical cleaning system 20. If defective printing is caused by unsatisfactory cleaning, therefore, the control unit 30 drives the mechanical cleaning system 20 to effect the supplementary cleaning in response to the optional command signal, thereby quickly compensating the deficiency in the cleaning effect. In consequence, the drum 1 can be stably cleaned for a longer period of time.

Since the blade 22 is not always in contact with the drum 1, moreover, the pressure of contact between the blade 22 and the drum 1 can be set higher than in the case of an apparatus in which a blade is always in contact with a drum. Accordingly, the residual toner, having failed to be removed by the magnetic cleaning system 14, can be easily scraped of by the blade 22. Also for this reason, prolonged stable cleaning can be ensured.

Furthermore, the mechanical cleaning system 20 is constructed so that the blade 22 can be brought into contact with or disengaged from the drum 1 with suitable timing by manual operation from outside the apparatus. If unsatisfactory cleaning is revealed by the result of printing, therefore, the mechanical cleaning system 20 can be manually operated to supplement the cleaning capacity of the magnetic cleaning system 14. Thus, the cleaning capacity can be improved in accordance with the result of printing, without interrupting the operation of the apparatus. Consequently, the print quality and printing efficiency can be prevented from lowering for a long period of time.

Further, the mechanical cleaning system 20 is designed so that the blade 22 can be brought into contact with the drum 1 by manually rotating the lever 24. Accordingly, the pressure of contact between the blade 22 and the drum 1 can be suitably changed by adjusting the stroke of the blade 22. Thus, the cleaning capacity of the whole apparatus can be properly adjusted in accordance with the result of printing. In this case, the scale 8 for measuring the shift of the lever 24 is located in the vicinity of the opening 7a of the casing 7, so that the cleaning capacity can be easily adjusted by utilizing the scale 8.

By bringing the blade 22 into contact with the drum 1 by manual operation, moreover, the paper dust from the large-sized paper sheet 9 can be rubbed off to be prevented from entering the developing device 4. Thus, developing can be effected so smoothly that the print quality can be prevented from lowering.

Since most of the residual toner is recovered for reuse by the magnetic cleaning system 14, the waste toner receiving portion 23 of the mechanical cleaning system 20 need not be made large in size, thus constituting no hindrance to the reduction in size of the electrophotographic apparatus.

It is to be understood that the present invention is not limited to the embodiment described above, and that various changes and modifications may be effected therein by one skilled in the art without departing from the scope or spirit of the invention.

The above embodiment was described with reference to an apparatus wherein the surface of the drum is cleaned by the magnetic cleaning system 14 while the drum makes one revolution after the image forming cycle is finished. However, the present invention is applicable also to an electrophotographic apparatus wherein development and magnetic cleaning art simultaneously performed by used of a developing device integral with a magnetic cleaning system.

Figure 16:
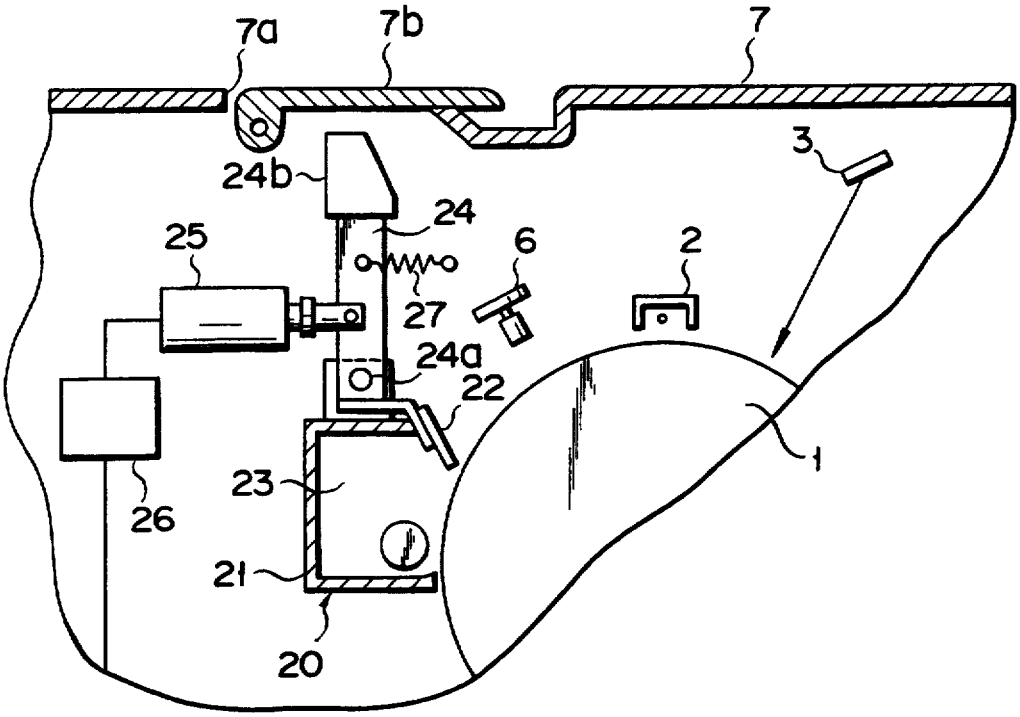
FIG. 16 is a sectional view showing an electrophotographic apparatus according to another embodiment of the invention.

In the embodiment described above, the lever 24 of the mechanical cleaning system 20 is designed so that its upper portion projects to the outside of the casing 7. Alternatively, however, the lever 24 may be arranged so that it cannot be carelessly operated to cause the blade 22 to damage the drum 1. More specifically, the whole lever 24 may be housed in the casing 7, as shown in FIG. 16, so that the lever 24 can be rotated manually to operate the blade 22 after lifting a cover 7b which is swingably attached to the opening 7a of the casing 7.

In the above embodiment, moreover, the key 3 on the control panel is used as the means for entering the optional command signal in the control unit 30. Alternatively, however, a switch (not shown) for optional command signal output may be disposed at a position in the vicinity of the lever 24 or the like where the result of printing ca be directly observed. In this arrangement, the optional command signal is entered in the control unit 30 by means of the switch, which can be depressed while observing the printing result. If the printing result indicates unsatisfactory cleaning, the operator can immediately depress the switch to actuate the blade 22 for supplementary cleaning. Thus, defective printing can be more quickly eliminated.

The output switch may be designed so that the optional command signal can be entered in the control unit 30 only while the switch is being manually depressed. Further, the switch may be arranged so as to be mechanically locked, thereby allowing the optional command signal to go on being inputted, when manually depressed.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An electrophotographic apparatus, comprising:

image forming means including an image carrier, for forming an image on a recording medium;

[magnetic] *primary* cleaning means for [magnetically] cleaning a surface of the image carrier for each cycle of image formation;

mechanical cleaning means for *supplementing said primary cleaning means by* mechanically cleaning the surface of the image carrier, said mechanical cleaning means including a contact member movable between a contact position where the contact member is in contact with the surface of the image carrier, thereby cleaning the surface, and an off position where the contact member is kept spaced apart from the surface of the image carrier, the contact member normally being in the off position; and actuating means for selectively moving the contact member from the normally off position to the contact position, said actuating means including drive means for moving the contact member to the contact position, and control means for actuating the drive means at predetermined time intervals and for predetermined operating time durations, said control means including means for changing said operating time durations when a predetermined number of said time intervals has occurred.

2. An apparatus according to claim 1, wherein said actuating means includes input means for entering a command signal in the control means, and said control means includes means for actuating the drive means to move the contact member to the contact position for a predetermined period of time without regard to said time intervals, in response to the command signal.

3. An apparatus according to claim 1, wherein said control means includes means for changing said time intervals when a predetermined number of said time intervals has occurred.

4. An apparatus according to claim 1, wherein said actuating means includes urging means for urging the contact member toward the off position thereof, and said drive means includes a solenoid/plunger mechanism connected to the contact member for moving the contact member to the contact position when the solenoid/plunger mechanism is energized.

5. An electrophotographic apparatus, comprising:

image forming means including an image carrier, for forming an image on a recording medium;

[magnetic] *primary* cleaning means for [magnetically] cleaning a surface of the image carrier for each cycle of image formation;

mechanical cleaning means for *supplementing said primary cleaning means by* mechanically cleaning the surface of the image carrier, said mechanical cleaning means including a contact member movable between a contact position where the contact member is in contact with the surface of the image carrier, thereby cleaning the surface, and an off position where the contact member is kept spaced apart from the surface of the image carrier, the contact member normally being in the off position;

drive means for moving the contact member from the normally off position to the contact position; and control means for actuating the drive means at regular time intervals, for gradually increasing predetermined operating times.

6. An electrophotographic apparatus, comprising:

image forming means including an image carrier, for forming an image on a recording medium;

[magnetic] *primary* cleaning means for [magnetically] cleaning a surface of the image carrier for each cycle of image formation;

mechanical cleaning means for mechanically cleaning the surface of the image carrier, said mechanical cleaning means including a contact member movable between a contact position where the contact member is in contact with the surface of the image carrier, thereby cleaning the surface, and an off position where the contact member is kept spaced apart from the surface of the image carrier, the contact member normally being in the off position; drive means for moving the contact member from the normally off position to the contact position; and control means for actuating the drive means at gradually reducing time intervals, for the same operating time.

7. An electrophotographic apparatus, comprising:

image forming means including an image carrier, for forming an image on a recording medium;

[magnetic] *primary* cleaning means for [magnetically] cleaning a surface of the image carrier for each cycle of image formation;

mechanical cleaning means for *supplementing said primary cleaning means by* mechanically cleaning the surface of the image carrier, said mechanical cleaning means including a contact member movable between a contact position where the contact member is in contact with the surface of the image carrier, thereby cleaning the surface, and an off position where the contact member is kept spaced apart from the surface of the image carrier, the contact member normally being in the off position;

a casing containing the image forming means, the [magnetic] *primary* cleaning means, and the mechanical cleaning means, said casing having an opening therein; and actuating means for selectively moving the contact member from the normally off position to the contact position, said actuating means including an operating member coupled to the contact member and movable integrally therewith, said operating member having an end portion projecting outwardly from the casing through said opening of the casing, and said operating member being manually operable from outside the casing, said actuating means including indicating means for indicating a shift of said operating member.

8. An apparatus according to claim 7, wherein said indicating means has a scale disposed on an outer surface of the casing in the vicinity of the opening.

9. An electrophotographic apparatus, comprising:

image forming means including an image carrier, for forming an image on a recording medium;

[magnetic] *primary* cleaning means for [magnetically] cleaning a surface of the image carrier for each cycle of image formation;

mechanical cleaning means for *supplementing said primary cleaning means by* mechanically cleaning the surface of the image carrier, said mechanical cleaning means including a contact member movable between a contact position where the contact member is in contact with the surface of the image carrier, thereby cleaning the surface, and an off position where the contact member is kept spaced apart from the surface of the image carrier, the contact member normally being in the off position;

a casing containing the image forming means, the [magnetic]*primary* cleaning means, and the mechanical cleaning means; and actuating means for selectively moving the contact member from the normally off position to the contact position, said actuating means including an operating member coupled to the contact member and movable integrally therewith, said operating member being arranged in the casing and having an end portion manually operable from outside the casing, said casing including an opening facing the end portion of the operating member, and a cover for exposing and closing the opening.

10. An electrophotographic apparatus, comprising:

image forming means including an image carrier, for forming an image on a recording medium;

[magnetic] *primary* cleaning means for [magnetically] cleaning a surface of the image carrier for each cycle of image formation;

mechanical cleaning means for *supplementing said primary cleaning means by* mechanically cleaning the surface of the image carrier, said mechanical cleaning means including a contact member movable between a contact position where the contact member is in contact with the surface of the image carrier, thereby cleaning the surface, and an off position where the contact member is kept spaced apart from the surface of the image carrier, the contact member normally being in the off position; and actuating means for selectively moving the contact member from the normally off position to the contact position, said actuating means including drive means for moving the contact member to the contact position, and control means for actuating the drive means at predetermined time intervals and for predetermined operating time durations, said control means including means for changing at least one of said operating time durations and said time intervals when a predetermined number of said time intervals has occurred.

* * * * *